US012755991B2

(12) United States Patent
Hammer et al.

(10) Patent No.: US 12,755,991 B2
(45) Date of Patent: Oct. 6, 2026

(54) FUEL-CELL EXHAUST SYSTEM

(71) Applicant: Purem GmbH, Neunkirchen (DE)

(72) Inventors: Jochen Hammer, Stuttgart (DE); Markus Birgler, Wernau (DE); Peter Wink, Goeppingen (DE); Patrick Schaller, Bopfingen (DE); Andreas Wacker, Plochingen (DE)

(73) Assignee: Purem GmbH, Neunkirchen (DE)

( * ) Notice: Subject to any disclaimer, the term of this patent is extended or adjusted under 35 U.S.C. 154(b) by 711 days.

(21) Appl. No.: 18/320,482

(22) Filed: May 19, 2023

(65) Prior Publication Data

US 2023/0378494 A1 Nov. 23, 2023

(30) Foreign Application Priority Data

May 20, 2022 (DE) .................... 10 2022 112 680.3

(51) Int. Cl.

*H01M 8/04007* (2016.01)
*H01M 8/04119* (2016.01)
*H01M 8/04291* (2016.01)
*H01M 8/0662* (2016.01)
*B60K 13/04* (2006.01)

(52) U.S. Cl.

CPC ... *H01M 8/04164* (2013.01); *H01M 8/04067* (2013.01); *H01M 8/04291* (2013.01); *H01M 8/0662* (2013.01); *B60K 13/04* (2013.01); *H01M 2250/20* (2013.01)

(58) Field of Classification Search

CPC .......... B01D 53/265; B01D 2258/0208; B60K 13/04; B60Y 2400/202; H01M 8/04067; H01M 8/04164; H01M 8/04291; H01M 8/0622; H01M 2250/40; Y02E 60/50

See application file for complete search history.

(56) References Cited

U.S. PATENT DOCUMENTS

| | | | | |
|---|---|---|---|---|
| 6,579,637 | B1 | 6/2003 | Savage et al. | |
| 10,950,878 | B2 * | 3/2021 | Oh | H01M 8/04835 |
| 2004/0149515 | A1 | 8/2004 | Toyoshima | |
| 2008/0185218 | A1 * | 8/2008 | Kondo | H01M 8/04156 181/252 |
| 2016/0359180 | A1 | 12/2016 | Adcock et al. | |

(Continued)

FOREIGN PATENT DOCUMENTS

| | | | | | |
|---|---|---|---|---|---|
| CN | 110492146 | A | | 11/2019 | |
| DE | 102016221566 | A1 | * | 5/2018 | H01M 8/04164 |
| DE | 10 2020 124 754 | A1 | | 4/2021 | |

(Continued)

OTHER PUBLICATIONS

Machine translation of KR 20200020517-A (Year: 2026).*

(Continued)

*Primary Examiner* — Eric S Ruppert
*Assistant Examiner* — Hans R Weiland
(74) *Attorney, Agent, or Firm* — Walter Ottesen, P.A.

(57) ABSTRACT

A fuel-cell exhaust system for a fuel-cell arrangement, in particular in a vehicle, includes a fuel-cell exhaust line through which fuel-cell exhaust gas can flow and a condenser having a condenser body through which the fuel-cell exhaust gas can flow. With the condenser, liquid is condensed out of the fuel-cell exhaust gas. A liquid separator is arranged downstream of the condenser.

17 Claims, 2 Drawing Sheets

(56) References Cited

U.S. PATENT DOCUMENTS

2021/0111421 A1* 4/2021 Martuscelli ....... H01M 8/04164

FOREIGN PATENT DOCUMENTS

| | | | | | |
|---|---|---|---|---|---|
| EP | 1 447 534 | A2 | | 8/2004 | |
| JP | 2002-8693 | A | | 1/2002 | |
| JP | 2003288924 | A | * | 10/2003 | |
| JP | 2004-199971 | A | | 7/2004 | |
| JP | 2005-171874 | A | | 6/2005 | |
| JP | 2007-242434 | A | | 9/2007 | |
| JP | 2008-130477 | A | | 6/2008 | |
| KR | 20200020517 | A | * | 2/2020 | ........ H01M 8/04291 |

OTHER PUBLICATIONS

Machine translation of DE-102016221566-A1 (Year: 2026).*
English translation of the Office action of the Korean Patent Office dated Oct. 20, 2025 in corresponding Korean patent application No. 10-2023-0065074.

* cited by examiner

FUEL-CELL EXHAUST SYSTEM

CROSS-REFERENCE TO RELATED APPLICATIONS

This application claims priority of German patent application no. 10 2022 112 680.3, filed May 20, 2022, the entire content of which is incorporated herein by reference.

TECHNICAL FIELD

The present disclosure relates to a fuel-cell exhaust system via which the process gas discharged from a fuel cell can be discharged to the environment as fuel-cell exhaust gas.

BACKGROUND

In order, in particular in the case of vehicles powered by electric motors, to enable the provision of the energy to operate the electric drive motors and also the other electrical energy loads in such vehicles, it is known to use fuel cells. In the operation of such a fuel cell, hydrogen, or an anode gas highly enriched with hydrogen, is supplied to an anode region. Oxygen, or air containing oxygen, is supplied as cathode gas to a cathode region. Electric current is generated, with hydrogen and oxygen being converted into water. The hydrogen-depleted anode exhaust gas and the water-enriched cathode exhaust gas leave the fuel cell as fuel-cell exhaust gas, or process gas. During operation of the fuel cell, at least the cathode exhaust gas is discharged to the environment. In various operating phases such as, for example, during purging, in particular of the anode region before the start of operation of the fuel cell, the anode exhaust gas, or the gas conducted through the anode region in such an operating phase, can also be discharged to the environment.

SUMMARY

It is an object of the present disclosure to provide a fuel-cell exhaust system for a fuel-cell arrangement, in particular in a vehicle, by which liquid, in particular water, entrained in the fuel-cell exhaust gas can be efficiently extracted from the fuel-cell exhaust gas.

This object is achieved, according to the disclosure, by a fuel-cell exhaust system for a fuel-cell arrangement, in particular in a vehicle, including a fuel-cell exhaust line through which fuel-cell exhaust gas can flow and a condenser unit having a condenser-unit body through which the fuel-cell exhaust gas can flow.

With the condenser unit, liquid is condensed out of the fuel-cell exhaust gas. This prevents fuel-cell exhaust gas, which in particular is enriched with water vapor, from being discharged to the environment, such that in particular the formation of a mist in the region of a tailpipe of a fuel-cell exhaust system can be avoided. The liquid extracted from the fuel-cell exhaust gas can be fed back into the fuel-cell process if required. It is also possible to use the condensed-out liquid, for example, as windshield washer water, for cleaning sensors in particular in vehicles for autonomous driving, for air humidification in air conditioning systems and the like.

There may be a liquid separating unit arranged downstream of the condenser unit. As a result of the condenser unit being arranged upstream of a liquid separating unit, it is ensured that condensed-out liquid, that is, droplets, can be efficiently separated from the fuel-cell exhaust gas in the liquid separating unit arranged further downstream and, if necessary, can be reused for various processes, for example in a vehicle, or can be discharged to the environment in liquid form.

For particularly efficient separation of liquid from the fuel-cell exhaust gas, it is proposed that the condenser-unit body be constructed substantially entirely with metal material or/and include at least one condenser-unit line element, preferably having a flattened flow cross-section, through which the fuel-cell exhaust gas can flow and around which a cooling medium can flow on an outer side.

In order to obtain the largest possible surface area for thermal interaction between the condenser unit and a cooling medium, the condenser-unit body may include a plurality of mutually parallel condenser-unit line elements through which the fuel-cell exhaust gas can flow.

For enhanced heat dissipation in this case, there may be a plurality of heat transfer fins provided on the outside of at least one, preferably each, condenser-unit line element.

For the purpose of integrating the condenser unit into the fuel-cell exhaust line, it is proposed that the condenser unit include an upstream condenser-unit connection element, connected to the condenser-unit body, for connecting the condenser unit to the fuel-cell exhaust line, or/and that the condenser unit include a downstream condenser-unit connection element, connected to the condenser-unit body, for connecting the condenser unit to the fuel-cell exhaust line.

For a structure that is lightweight, inexpensive to manufacture and in particular corrosion-resistant, the upstream condenser-unit connection element may be constructed with plastic material, or/and the downstream condenser-unit connection element may be constructed with plastic material.

The fuel-cell exhaust line may include an upstream line portion leading to the liquid separating unit, and a downstream line portion leading away from the liquid separating unit. The condenser unit in this case may be arranged in the upstream line portion.

For the purpose of discharging liquid from the fuel-cell exhaust stream downstream of the condenser unit, the liquid separating unit may include an upstream separating line part, a downstream separating line part and an opening region in the region of the downstream separating line part adjacent to the upstream separating line part.

In order to ensure defined flow conditions for the fuel-cell exhaust gas also in the region of the liquid separating unit, it is proposed that an upstream end portion of the downstream separating line part be positioned to engage in a downstream end portion of the upstream separating line part, in such a manner that a liquid separating opening of the opening region is formed between the upstream end portion of the downstream separating line part and the downstream end portion of the upstream separating line part.

The opening region may be open to a liquid collecting chamber, via which the liquid collected therein can then either be discharged to the environment or fed back into the fuel cell process if required.

There may be a swirl flow generation unit provided upstream of the opening region. The generation of a swirl flow in the fuel-cell exhaust flow creates a centrifugal force that acts upon the condensed liquid, forces the liquid radially outward and thus has the effect that it is primarily the liquid conveyed radially outward, or a portion of the fuel-cell exhaust flow highly enriched with such liquid, that is drawn off in the opening region.

The swirl flow generation unit may include a plurality of flow deflector elements that succeed one another in the circumferential direction with respect to a flow center axis and are pitched with respect to the exhaust-gas main flow direction. In order to provide a very lightweight structure, the swirl flow generation unit may also be constructed substantially entirely with plastic material.

In order to muffle noise produced in the region of a fuel cell, a muffler unit may be provided, including:

- a muffler housing having a fuel-cell exhaust inlet region and a fuel-cell exhaust outlet region, the upstream line portion of the fuel-cell exhaust line connecting to the fuel-cell exhaust inlet region, and the downstream line portion of the fuel-cell exhaust line connecting to the fuel-cell exhaust outlet portion,
- at least one muffler chamber formed in the muffler housing, the at least one muffler being separated from the liquid collecting chamber by a housing base of the muffler housing, there being at least one liquid passage opening, connecting at least one muffler chamber to the liquid collecting chamber for the purpose of liquid exchange, provided in the housing base, and there being at least one liquid drain opening, for draining liquid from the at least one liquid collecting chamber, provided on the muffler housing.

The muffler unit also may be constructed substantially entirely with plastic material, in order to obtain a lightweight and corrosion-resistant structure that can be realized inexpensively.

Likewise, the fuel-cell exhaust line and/or the liquid separating unit may be constructed substantially entirely with plastic material.

BRIEF DESCRIPTION OF DRAWINGS

The invention will now be described with reference to the drawings wherein.

DETAILED DESCRIPTION

Figure 1:
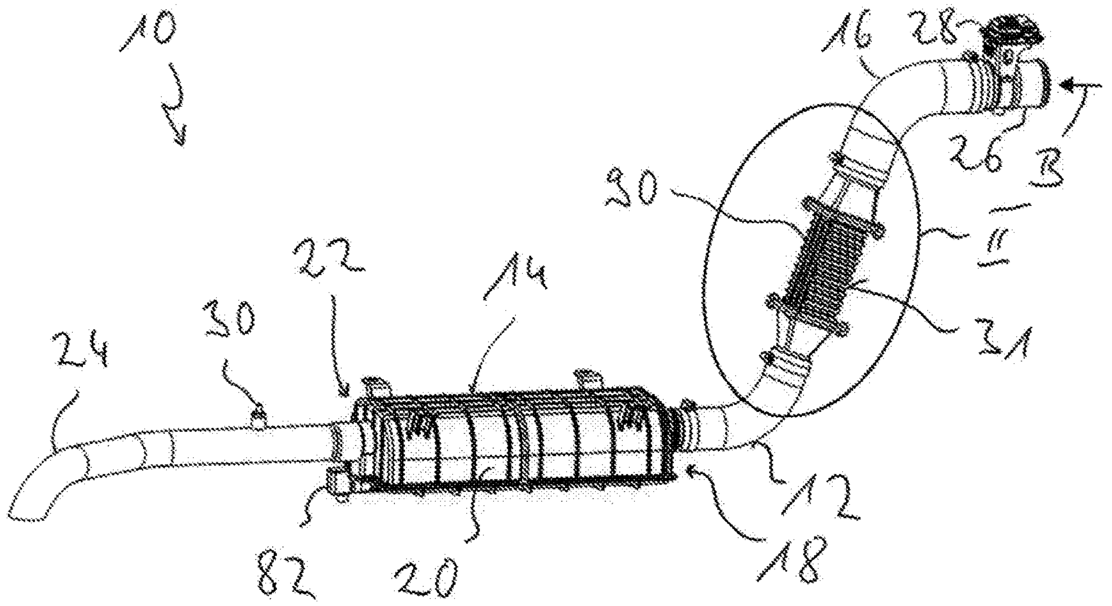
FIG. 1 shows a perspective view of a fuel-cell exhaust system.
Figure 2:
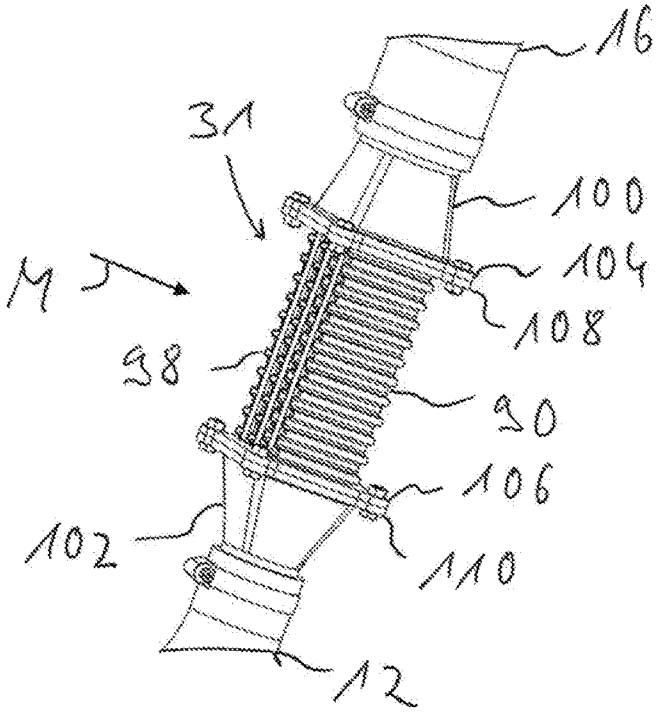
FIG. 2 shows an enlarged representation of the detail II of the fuel-cell exhaust system of FIG. 1.

FIG. 1 shows a fuel-cell exhaust system 10 that may be provided in association with a fuel-cell system used in a vehicle to generate electrical energy.

The fuel-cell exhaust system 10 includes a fuel-cell exhaust line 12, denoted in general by 12, through which fuel-cell exhaust gas B can flow, and a muffler unit 14 integrated into the fuel-cell exhaust line 12. An upstream line portion 16 of the fuel-cell exhaust line 12 connects to the muffler unit 14 in a fuel-cell exhaust inlet region 18 of a muffler housing 20. In a fuel-cell exhaust outlet region 22 of the muffler housing 20, a downstream line portion 24 of the fuel-cell exhaust line 12 connects to the muffler unit 14. For example, the fuel-cell exhaust gas B discharged from one or more fuel cells of a fuel-cell system can be discharged to the environment via the downstream line portion 24 of the fuel-cell exhaust line 12. An upstream end region 26 of the upstream line portion 16 of the fuel-cell exhaust line 12 may be configured to be connected to different system regions of one or more fuel cells, or fuel cell stacks, discharging fuel-cell exhaust gas as process gas.

For example, the anode region and/or the cathode region of the fuel cell, or of each fuel cell, may be connected to the upstream end region in order to introduce the process gas leaving the anode region and/or the process gas leaving the cathode region, as fuel-cell exhaust gas B, into the fuel-cell exhaust system 10 in a defined manner. Furthermore, ambient air may be introduced into the fuel-cell exhaust system 10, for example via a line region that is open to the environment.

To set the back-pressure generated in the fuel-cell exhaust system 10, or also the gas flows introduced into it, a gas flow regulating valve 28 may be arranged, for example, near the upstream end region 26 of the upstream line portion 16 of the fuel-cell exhaust system 10. A hydrogen sensor 30 may be provided in the downstream line portion 24 to provide information about the hydrogen concentration of the fuel-cell exhaust stream flowing through the downstream line portion 24. This stream can contain hydrogen, in particular if the anode region is purged at the beginning, or before the beginning, of the operation of the fuel-cell and the process gas discharged from the anode region is discharged to the environment via the fuel-cell exhaust system 10. If the signal generated by the hydrogen sensor 30 indicates a hydrogen concentration which is too high, a proportion of air, or an increased proportion of air, may be added to the fuel-cell exhaust gas B conducted through the fuel-cell exhaust system 10, for example by controlling the gas flow regulating valve 28 accordingly, in order thus to achieve a lower hydrogen concentration.

Upstream of the muffler unit 14, a condenser unit, denoted in general by 31, may be provided, which supports the condensing-out of liquid, or vapor, generally water vapor, transported in the fuel-cell exhaust gas B. In the muffler unit 14, as described below, such condensed liquid can be extracted from the fuel-cell exhaust gas B, collected and fed back into the fuel-cell process.

The structure, or function, of the muffler unit 14 is explained in detail below with reference to FIG. 4.

The muffler housing 20 is elongate in the direction of a muffler-housing longitudinal axis L, and is configured, in an upstream end region 32, for connection of the upstream line portion 16 of the fuel-cell exhaust line 12. In a downstream end region 34, the muffler housing 20 is configured for connection of the downstream line portion 24 of the fuel-cell exhaust line. For example, the line portions 16, 24 may be interfaced to corresponding connection pieces of the muffler housing 20 by the use of pipe clamps or the like.

Formed inside the muffler housing 20 are two muffler chambers 36, 38, as well as a liquid separating chamber 40. The upstream muffler chamber 36 is separated from the liquid separating chamber 40 by a dividing wall 42, and the downstream muffler chamber 38 is separated from the upstream muffler chamber 36 by a dividing wall 44. The downstream line portion 24 of the fuel-cell exhaust line 12 is open to the downstream muffler chamber 38. The upstream line portion 16 of the fuel-cell exhaust line 12 is open to the two muffler chambers 36, 38 via a liquid separating line portion 46 of a liquid separating unit, denoted in general by 45, arranged in the liquid separating chamber 40. The separating line portion 46 of the liquid separating unit 45 includes a tubular upstream separating line part 48 connecting to the upstream line portion 16 of the fuel-cell exhaust line 12 in the upstream end region 32 of the muffler housing 20, as well as a downstream separating line part 50 connecting to, or passing through, the dividing wall 42. The downstream separating line part 50 of the separating line portion 46 may connect to, or be realized integrally with, a single-piece or multi-piece fuel-cell exhaust pipe 52 extending inside the muffler housing 20. The fuel-cell exhaust pipe 52 is open to the upstream muffler chamber 36 via a plurality of openings 56 realized in a pipe wall 54 of the fuel-cell exhaust pipe 52. The fuel-cell exhaust pipe 52 is open to the downstream muffler chamber 38 via a plurality of openings 58 realized in the pipe wall 54. The fuel-cell exhaust pipe 52 extends through the dividing wall 44 that separates the two muffler chambers 36, 38 from each other, or it may be realized integrally with it, at least partially, and connect, in the downstream end region 34 of the muffler housing 20, to the downstream line portion 24 of the fuel-cell exhaust line 12.

It can be seen in this structure that the fuel-cell exhaust gas B conducted through the muffler unit 14 can flow through the muffler housing 20, substantially without flow deflection, in a straight line along the longitudinal axis L of the muffler housing, such that no significant flow resistance is generated by the muffler unit 14. Nevertheless, it is possible to muffle sound by reflection and absorption as a result of the communication with the various muffler chambers 36, 38. For this purpose, for example additional sound-muffling material such as, for example, porous fibrous or foamed material, may be arranged in one or both muffler chambers 36, 38. It is to be noted that more than two successive muffler chambers may also be provided, or also that only a single such muffler chamber may be provided in the interior of the muffler housing 20. Furthermore, at least one of the muffler chambers may act as a resonator chamber of a Helmholtz resonator, and different ones of the muffler chambers may communicate with each other via additional fuel-cell exhaust pipes.

The upstream separating line part 48 has a downstream end portion 60 that widens, for example, substantially conically in the direction of an exhaust-gas main flow direction H along a flow center axis S. At the same time, the downstream separating line part has an upstream end portion 62, which widens, for example, conically in the exhaust-gas main flow direction H in this region, and is positioned to engage in the downstream end portion 60 of the upstream separating line part 48. A substantially annular liquid separating opening 66 is formed in an opening region 64 of the separation line section 46, between the end portions 60, 62 that widen radially in the exhaust-gas main flow direction H along the flow center axis S.

Upstream of the opening region 64, a swirl flow generating unit 68 is arranged, for example, in the upstream separating line part 48, which is realized integrally with a housing cover that provides an upstream end wall of the muffler housing 20, or in the upstream line portion 16 of the fuel-cell exhaust line 12. This unit may include a plurality of substantially radially extending flow deflector elements 69 that succeed one another in the circumferential direction about the flow center axis S and are pitched with respect to the exhaust-gas main flow direction H. The swirl flow generation unit 68 generates a swirl flow in the fuel-cell exhaust gas B conducted in the exhaust-gas main flow direction H. Due to this swirl flow and the centrifugal forces created therein, liquid components transported in the fuel-cell exhaust gas B, for example water droplets or the like, are forced radially outward and accumulate at a concentration in the radially outer region of the fuel-cell exhaust-gas flow. This radially outer part of the fuel-cell exhaust-gas flow can be drained at least partially through the liquid separating opening 66 into the liquid separating chamber 40, such that liquid extracted from the fuel-cell exhaust-gas flow can accumulate in the liquid separating chamber 40.

A liquid collecting chamber 70 is formed in what is a lower region of the muffler housing 20 in a vertical direction V when the fuel-cell exhaust system 10 has been mounted in a vehicle. This chamber can preferably extend along the entire length of the muffler housing 20, from the upstream end region 32 to the downstream end region 34 thereof, and is separated from the two muffler chambers 36, 38 and also from the liquid separating chamber 40 by a housing base 72. In association with each of these chambers, there is respectively at least one liquid passage opening 74, 76 and 78, respectively realized in the housing base 72. Liquid accumulating in each of the muffler chambers 36, 38 and also the liquid separating chamber 40 can pass through the associated liquid passage openings 74, 76, 78 into the liquid collecting chamber 40 and accumulate there.

At least one liquid drain opening 80 having a liquid discharge valve 82 is provided in association with the liquid collecting chamber 70. It can be seen in FIG. 4 that, when a fuel-cell exhaust system has been installed in a vehicle, the muffler housing 20 is inclined downward in the exhaust-gas main flow direction H, such that the region of the liquid collecting chamber 70 in which the liquid drain opening 80 is positioned forms substantially the lowest region of the liquid collecting chamber 70 in the vertical direction V. This means that liquid contained in the liquid collecting chamber 70 is essentially in the region of the liquid drain opening 80. This means that liquid contained in the liquid collecting chamber 70 basically accumulates in the region of the liquid drain opening 80, or of the liquid discharge valve 82, so that when the liquid discharge valve 82 is open, liquid flows out of the liquid collecting chamber 70 under the effect of gravity and may, for example, be fed back into the fuel cell process or discharged to the environment.

Figure 4:
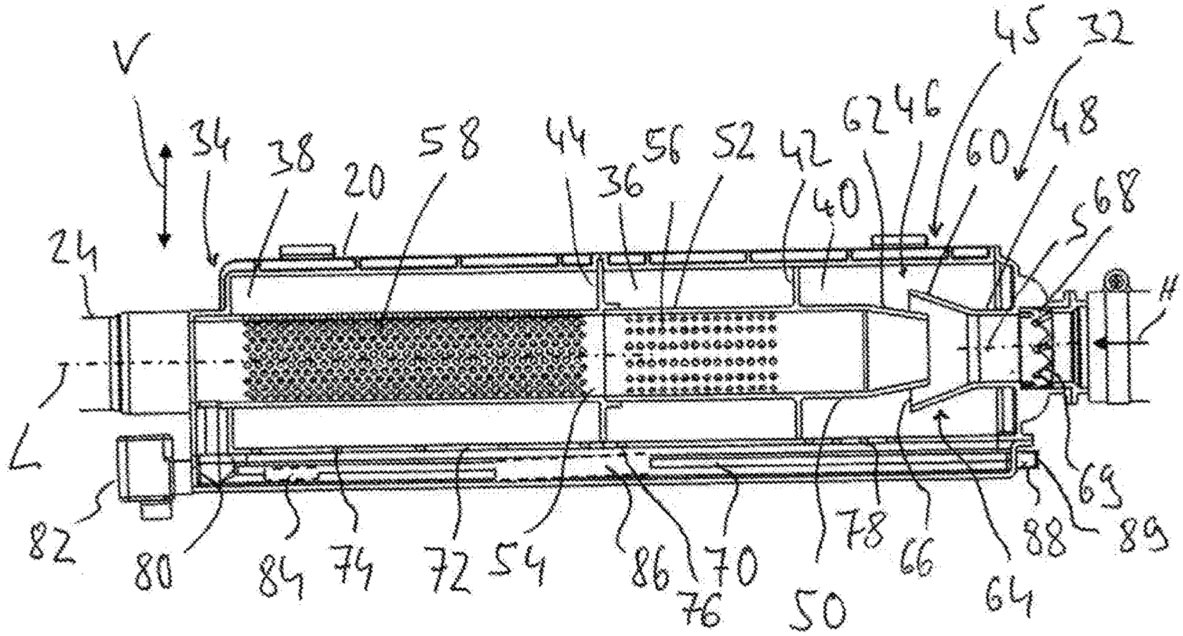

A liquid level sensor 84, represented schematically in FIG. 4, the output signal of which indicates the amount of liquid that has accumulated in the liquid collection chamber 70, may be provided in association with the liquid collection chamber 70.

If this quantity is sufficiently large to allow the liquid, that is, water, to be used in fuel cell operation or in other systems of a vehicle, the liquid discharge valve 82 can be opened. Also, if a threshold level is exceeded and there is a risk that fluid can no longer flow into the fluid collecting chamber 70 from at least the lowest region of the downstream muffler chamber 38, the fluid discharge drain 82 can be opened to discharge fluid from the fluid collection chamber 70.

Furthermore, a heating unit 86 represented schematically in FIG. 4 may be assigned to the liquid collecting chamber 70. This can heat, by electrical excitation, the liquid accumulating in the liquid collecting chamber 70 and thus prevent it from freezing, or thaw the frozen liquid again. This ensures that liquid can be discharged from the liquid collecting chamber 70 at any time, in particular even at comparatively low ambient temperatures, and can be used again, for example in fuel cell operation.

Furthermore, at least one hydrogen discharge opening 89, constituted by a hydrogen discharge nozzle 88, may be provided in association with the liquid collecting chamber 70. This hydrogen discharge opening 89 may be positioned in such a way that it is higher in the vertical direction V than the highest region of the liquid collecting chamber 70. Hydrogen introduced into the fuel-cell exhaust system 10 during fuel-cell operation, or during purging of the anode region, can thus, when it enters the liquid collecting chamber 70 via the liquid passage openings 74, 76, 78, accumulate in the highest region of the liquid collecting chamber 70, in which the liquid collecting chamber 70 is open to the environment via the hydrogen discharge opening 89. Thus, hydrogen entering the liquid collecting chamber 70 can be substantially permanently discharged to the environment without the risk of a critical hydrogen concentration being formed in the liquid collecting chamber 70.

Figure 3:
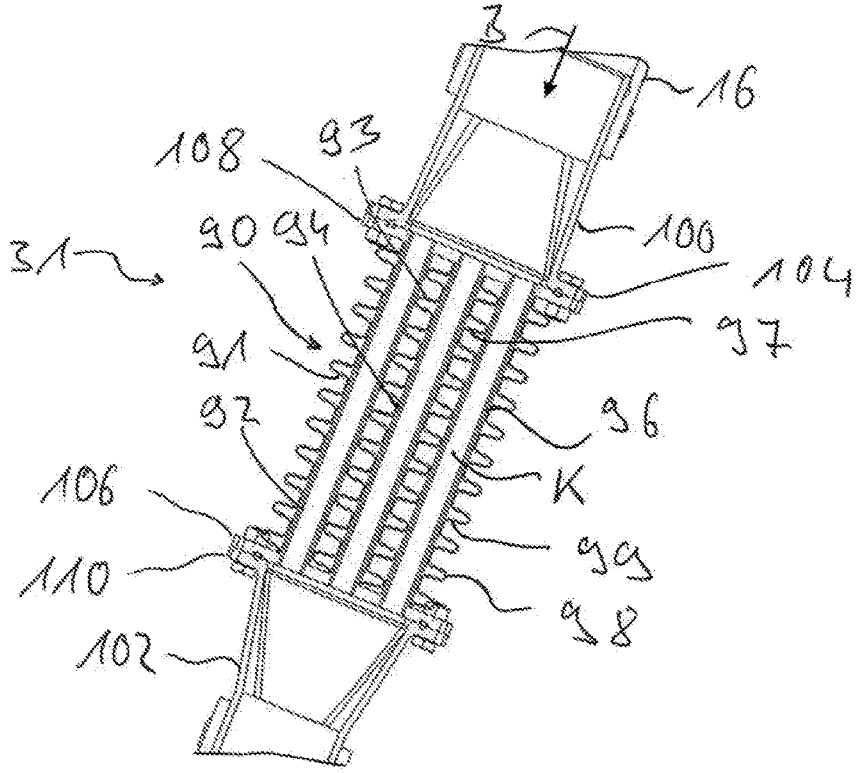
FIG. 3 shows in longitudinal section the condenser unit represented in detail II; and, FIG. 4 shows a longitudinal sectional view of a muffler unit of the fuel-cell exhaust system of FIG. 1.

The condenser unit 31 includes a condenser-unit body 90, represented in longitudinal section in FIG. 3, which can preferably be constructed substantially entirely with metal material. In the configuration example represented, the condenser-unit body 90 has three condenser-unit line elements 92, 94, 96 arranged next to each other, each of which provides a flow channel K for the fuel-cell exhaust gas B and through which the fuel-cell exhaust gas B flows in parallel with each other. The three condenser-unit line elements 92, 94, 96 provide a flattened flow cross-section in their inner volume for the fuel-cell exhaust gas B flowing through them, for example having an approximately rectangular or flattened round cross-sectional geometry. The result is that, relative to the flow cross-sectional area, there is a comparatively large surface available for heat transfer. It is to be noted that, for example, more than three condenser-unit line elements 92, 94, 96 may also be provided on the condenser-unit body 90.

The surface available for heat transfer to a medium M, for example air, flowing around the condenser-unit body 90 may be further increased by providing heat transfer fins 98 on an outer side of the condenser-unit line elements 92, 94, 96, which can preferably be oriented substantially parallel to a flow direction of the medium M flowing around the condenser-unit body 90, in order to ensure the fastest possible flow-around, and thus efficient heat removal. For example, the heat transfer fins 98 may be constituted by fin elements 91, 93, 97, 99, realized on the flat outer sides of the condenser-unit line elements 92, 94, 96, for example in the form of corrugations, which are in heat transfer contact with at least one of the condenser-unit line elements 92, 94, 96. Alternatively, the heat transfer ribs 98 may be formed by moldings in the body material of the condenser-unit line elements 92, 94, 96, which are also formed on the inside, that is, on the surface over which the fuel-cell exhaust gas B flows, in order to provide an enlarged surface for heat transfer there as well.

If air, that is, ambient air, is used as the medium M used for cooling, the fuel-cell exhaust system 10 is installed in a vehicle in such a way that, similar to the case with a vehicle radiator, the air transported by the vehicle airstream can flow efficiently around the condenser unit 31.

It is to be noted that, as an alternative to air flowing around the condenser-unit body, it is also possible, for example, for a liquid to flow around it, in order to absorb heat in this liquid and to enable it to be transferred, for example in a further heat exchanger, to the air to be introduced in a vehicle interior.

For the purpose of integrating the condenser unit 31 into the upstream line portion 16 of the fuel-cell exhaust line 12, the condenser unit 31 has an upstream condenser-unit connection element 100 and a downstream condenser-unit connection element 102. Via respective plate-type coupling regions 104 and 106, these can be interfaced in a gas-tight and liquid-tight manner to respective plate-type coupling regions 108, 110 of the condenser-unit body 90, for example, by screw connection.

Whereas, for the most efficient heat transfer, the condenser-unit body 90 is produced from metal material such as, for example, high-grade steel or copper, substantially all other functional regions of the fuel-cell exhaust system may be constructed with inexpensive and also lightweight plastic material. This applies in particular to the line portions 16, 24, the muffler housing 20, or the system regions arranged inside it, such as, for example, the dividing walls 42, 44, all functional parts of the liquid separating unit 45 and the swirl flow generating unit 68. The use of plastic material for these components results in a structure of low weight which, moreover, can be produced at low cost and with a large degree of freedom in shaping. Due to the fact that the fuel-cell exhaust gas B contains a comparatively high proportion of liquid, in particular water, corrosion problems in the region of the fuel-cell exhaust system 10 are thus substantially completely eliminated.

A fuel-cell exhaust system according to the disclosure combines functions that are advantageous, or relevant, for its operation, or for the operation of a fuel-cell system in a vehicle. On the one hand, the muffling function of the muffler unit ensures that noise on the flow path of the fuel-cell exhaust gas caused, for example, by the compressors guiding the process gas through the fuel cell, is reduced or almost completely excluded. On the other hand, it is possible to extract a portion of the liquid entrained in the fuel-cell exhaust gas, that is, in particular water, from the fuel-cell exhaust gas, such that the extracted portion of the liquid is not expelled as liquid vapor into the environment with the fuel-cell exhaust gas, but can either be discharged into the environment in liquid form or, if required, fed back into the operating cycle of a fuel-cell system or other systems. The occurrence of a critical hydrogen concentration, in particular in the region of the muffler unit, is avoided by the permanent possibility of discharging hydrogen to the environment. Also contributing to this functionality, in particular, is the fact that the fuel-cell exhaust gas can flow through the muffler unit substantially in a straight line. This avoids pronounced bends in pipe portions carrying the fuel-cell exhaust gas, in particular inside the muffler unit, and the resulting flow deflections.

Since water, or water vapor, and hydrogen can be drained from the fuel-cell exhaust gas during operation of a fuel-cell system and, if necessary, fed back into the fuel-cell process, for example, excessive loading of the environment of a vehicle with such substances is avoided as far as possible.

It is to be noted that such a fuel-cell exhaust system may also be used in stationary fuel-cell systems or, for example, in fuel-cell systems provided in ships or the like.

It is understood that the foregoing description is that of the preferred embodiments of the invention and that various changes and modifications may be made thereto without departing from the spirit and scope of the invention as defined in the appended claims.

The invention claimed is:

1. A fuel-cell exhaust system for a fuel-cell arrangement including for a vehicle, the fuel-cell exhaust system comprising:

a fuel-cell exhaust line for accommodating a flow of fuel-cell exhaust gas therethrough;

a condenser having a condenser body for passing said fuel-cell exhaust gas therethrough;

a liquid separator arranged downstream of said condenser;

a liquid collecting chamber;

wherein said liquid separator comprises:

an upstream separating line part for receiving said flow of fuel-cell exhaust gas passed through said condenser and for passing said flow of fuel-cell exhaust gas therethrough in an exhaust-gas main flow direction along a flow center axis;

a downstream separating line part for receiving said flow of fuel-cell exhaust gas passed through said upstream separating line part and for passing said flow of fuel-cell exhaust gas therethrough in said exhaust-gas main flow direction along said flow center axis; and, said upstream separating line part and said downstream separating line part conjointly defining an opening region whereat said downstream separating line part and said upstream separating line part are mutually adjacent, said opening region being open towards said liquid collecting chamber for draining liquid components transported in the flow of fuel-cell exhaust gas passed through said upstream separating line part into said liquid collecting chamber upstream of said downstream separating line part.

2. The fuel-cell exhaust system of claim 1, wherein at least one of the following applies:

i) said condenser body is made with metal; and, ii) said condenser body includes at least one condenser line for passing the fuel-cell exhaust gas therethrough and around which a cooling medium can flow on an outer side thereof.

3. The fuel-cell exhaust system of claim 2, wherein said condenser body includes a plurality of mutually parallel condenser lines for accommodating passage of the fuel-cell exhaust gas therethrough.

4. The fuel-cell exhaust system of claim 3, wherein at least one of the following applies:

i) a plurality of heat transfer fins are provided on an outer side of said at least one condenser line; and, ii) a plurality of heat transfer fins are provided on an outer side of each one of said plurality of condenser lines.

5. The fuel-cell exhaust system of claim 1, wherein at least one of the following applies:

i) said condenser includes an upstream condenser connection element connected to said condenser body for connecting said condenser to said fuel-cell exhaust line; and, ii) said condenser includes a downstream condenser connection element connected to said condenser body for connecting said condenser to said fuel-cell exhaust line.

6. The fuel-cell exhaust system of claim 5, wherein at least one of the following applies:

i) said upstream condenser connection element is made with plastic material; and, ii) said downstream condenser connection element is made with plastic material.

7. The fuel-cell exhaust system of claim 1, wherein said fuel-cell exhaust line includes an upstream line portion leading to said liquid separator and a downstream line portion leading away from said liquid separator; and, said condenser is arranged in said upstream line portion.

8. The fuel-cell exhaust system of claim 1, wherein:

said downstream separating line part has an upstream end portion and said upstream separating line part has a downstream end portion; and, said upstream end portion is positioned to engage in said downstream end portion so as to cause a liquid separating opening of said opening region to be formed between said upstream end portion and said downstream end portion.

9. The fuel-cell exhaust system of claim 1, further comprising a liquid collecting chamber; and, said opening region being open to said liquid collecting chamber.

10. The fuel-cell exhaust system of claim 1, further comprising a swirl flow generator arranged upstream of said opening region.

11. The fuel-cell exhaust system of claim 10, wherein at least one of the following applies:

i) said swirl flow generator comprises a plurality of flow deflectors succeeding one another in circumferential direction with respect to a flow center axis (S) and said plurality of flow deflectors are pitched with respect to the exhaust-gas main flow direction; and, ii) said swirl flow generator is made with plastic material.

12. The fuel-cell exhaust system of claim 7, further comprising a muffler including:

a muffler housing having a fuel-cell exhaust inlet region and a fuel-cell exhaust outlet region;

said upstream line portion of said fuel-cell exhaust line being connected to said fuel-cell exhaust inlet region and said downstream line portion of said fuel-cell exhaust line being connect to said fuel-cell exhaust outlet region;

at least one muffler chamber being formed in said muffler housing;

said muffler housing having a housing base separating said at least one muffler chamber from said liquid collecting chamber;

at least one liquid passage opening being provided in said housing base connecting said at least one muffler chamber to said liquid collecting chamber for permitting a liquid exchange; and, at least one liquid drain opening provided on said muffler housing for draining liquid from said at least one liquid collecting chamber.

13. The fuel-cell exhaust system of claim 12, wherein said muffler is made with plastic material.

14. The fuel-cell exhaust system of claim 1, wherein at least one of the following applies:

i) said fuel-cell exhaust line is made with plastic material; and, ii) said liquid separator is made with plastic material.

15. The fuel-cell exhaust system of claim 1, wherein:

said condenser body includes at least one condenser line for passing the fuel-cell exhaust gas therethrough and around which a cooling medium can flow on an outer side thereof; and said at least one condenser line has a flattened flow cross section.

16. The fuel-cell exhaust system of claim 1, wherein:

said upstream separating line part has a downstream end portion widening in the direction of the exhaust-gas main flow direction; and said downstream separating line part has an upstream end portion widening in the direction of said exhaust-gas main flow direction.

17. The fuel-cell exhaust system of claim 16, wherein at least one of:

said upstream end portion of said downstream separating line part engages in said downstream end portion of said upstream separating line part;

said opening region comprises an annular liquid separating opening formed between said downstream end portion of said upstream separating line part and said upstream end portion of said downstream separating line part.

* * * * *